UNITED STATES PATENT OFFICE.

PAUL COMMENT, OF MÜLHAUSEN, ALSACE, FRANCE, ASSIGNOR TO SOCIÉTÉ FABRIQUES DE PRODUITS CHIMIQUES DE THANN ET DE MULHOUSE, OF RUE DE LA MERZEAU, MÜLHAUSEN, ALSACE, FRANCE.

MANUFACTURE OF POTASSIUM SULFATE.

1,389,861.  Specification of Letters Patent.  Patented Sept. 6, 1921.

No Drawing.  Application filed December 20, 1919.  Serial No. 346,318.

*To all whom it may concern:*

Be it known that I, PAUL COMMENT, a citizen of the Republic of France, residing at Mülhausen, Alsace, France, have invented certain new and useful Improvements in the Manufacture of Potassium Sulfate, of which the following is a specification.

This invention relates to the manufacture of potassium sulfate of high degree of purity from potassium bisulfate and potassium chlorid

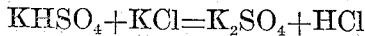

$$KHSO_4 + KCl = K_2SO_4 + HCl$$

The manufacture of potassium sulfate by calcining a mixture of potassium bisulfate and potassium chlorid is very difficult and in order that the product may be of a high degree of purity, and practically free from chlorid and sulfuric acid, the calcination must be of long duration, even though the parent materials have been thoroughly mixed before and during the calcination.

By the present invention a better result is obtained by very finely grinding the parent materials and intimately mixing them in the proportions indicated by the foregoing equation, or in proportions in which the bisulfate is in excess, the product then being quite free from chlorid.

Potassium bisulfate obtained in the ordinary manner and potassium chlorid are ground in a disintegrator to such a degree of fineness that they pass without residue through a sieve having 50, or, better, 60, 70 or 80, threads per inch.

The finely ground powders are mixed in an ordinary apparatus until the mixture is homogeneous. The mixture is then charged into the pan of an ordinary salt cake furnace and heated to a temperature of 300° C. Instead of a salt cake furnace any other kind of furnace suitable for the purpose may be used.

There is no object in working the mass while it is being heated, so that the doors of the furnace may remain closed and gases rich in hydrogen chlorid are obtained. The relatively low temperature of 300° to 350° C. at which the operation is conducted allows of the condensation of a concentrated hydrochloric acid practically free from sulfuric acid.

The sulfate thus made contains very little chlorid and the operation does not exceed three hours in duration. The product remains porous and does not adhere to the bottom of the pan or to the masonry of the furnace, as is the case when the foregoing conditions have not been observed, these conditions constituting the characteristic feature of the invention.

Potassium sulfate free from chlorid may be obtained by the same process when the potassium bisulfate is from 3-5 per cent. in excess in the mixture. There is obtained a product free from chlorid but containing sulfuric acid. The mixture after it has been heated in the manner described above may be further heated in an ordinary salt cake furnace to a temperature of 700° C. as is the ordinary practice in the manufacture of sodium sulfate. In this case the apparatus in which the mixture is first heated to 300° C., as already described, may be heated by the hot gases coming from the calcining furnace and the two apparatus may be combined in the manner of an ordinary salt cake furnace. The sulfuric acid is condensed and used again for making potassium bisulfate.

The reaction between the potassium bisulfate and potassium chlorid may be carried out under better conditions in respect of its duration, when there is added to the mixture, before its introduction into the furnace, a certain proportion of water. The amount of water added and the manner in which it is added should be such that the mass still remains pulverulent. For this purpose there may be used, for example, a mixer above which there is a device for introducing atomized water, or any other analogous arrangement.

I claim—

1. A process of making potassium sulfate of high degree of purity, from potassium bisulfate and potassium chlorid, which process consists in finely grinding the two compounds, making a homogeneous mixture of the powders and heating the mixture.

2. A process of making potassium sulfate of high degree of purity, from potassium bisulfate and potassium chlorid, which process consists in finely grinding the two compounds, making a homogeneous mixture of the powders, adding water to the mixture and finally heating it.

3. A process of making potassium sulfate of high degree of purity, from potassium bisulfate and potassium chlorid, which process consits in finely grinding these compounds, making a homogeneous mixture of the powders and heating the mixture to a temperature of 300° C.

4. A process of making potassium sulfate of high degree of purity, from potassium bisulfate and potassium chlorid, which process consists in finely grinding these compounds, making a homogeneous mixture of the powders, adding water in such proportion that the mixture remains pulverulent and heating the mixture to 300° C.

5. A process of making potassium sulfate of high degree of purity, from potassium bisulfate and potassium chlorid, which process consists in finely grinding these compounds, making a homogeneous mixture of the powders in such proportion that there is an excess of potassium bisulfate, heating the mixture to a moderate temperature and recovering the hydrochloric acid evolved, and thereafter heating the mixture to a high temperature and recovering the sulfuric acid evolved.

6. A process of making potassium sulfate of high degree of purity, from potassium bisulfate and potassium chlorid, which process consists in finely grinding these compounds, making a homogeneous mixture of the powders in such proportion that there is an excess of potassium bisulfate, adding water to the mixture in such proportion that the mixture remains pulverulent, heating the mixture to a moderate temperature and recovering the hydrochloric acid evolved, and thereafter heating the mixture to a high temperature and recovering the sulfuric acid evolved.

7. A process of making potassium sulfate of high degree of purity, from potassium bisulfate and potassium chlorid, which process consists in finely grinding these compounds, making a homogeneous mixture of the powders, heating the mixture and recovering the hydrogen chlorid evolved in the state of concentrated hydrochloric acid.

In testimony whereof I affix my signature.

PAUL COMMENT.